United States Patent [19]

Lakey, Sr.

[11] Patent Number: 4,819,581

[45] Date of Patent: Apr. 11, 1989

[54] METHOD OF INDUCING FEEDING BEHAVIOR IN FISH

[76] Inventor: Robert W. Lakey, Sr., Rte. 2 Box 219, Longview, Tex. 75605

[21] Appl. No.: 96,372

[22] Filed: Sep. 14, 1987

[51] Int. Cl.$^4$ .............................................. A01K 61/00
[52] U.S. Cl. ...................................... 119/3; 119/51 R
[58] Field of Search ......................... 119/2, 3, 4, 51 R

[56] References Cited

U.S. PATENT DOCUMENTS

| | | | |
|---|---|---|---|
| 2,245,495 | 6/1941 | Pemble | 119/3 X |
| 3,728,988 | 4/1973 | Shapero et al. | 119/2 |
| 4,198,926 | 4/1980 | Morse | 119/4 |

FOREIGN PATENT DOCUMENTS

| | | | |
|---|---|---|---|
| 2808519 | 9/1979 | Fed. Rep. of Germany | 119/3 |
| 2904152 | 8/1980 | Fed. Rep. of Germany | 119/3 |
| 49-27799 | 7/1974 | Japan | 119/3 |

*Primary Examiner*—Robert P. Swiatek
*Attorney, Agent, or Firm*—Ronald B. Sefrna

[57] ABSTRACT

A method of inducing feeding behavior and accelerating the feeding activity of fish contained within an impoundment of known volume in order to increase the number of fish taken from such an impoundment by baited hook and line within a given period of time. The method includes the introduction of an oxidizing agent to the water of the impoundment so as to achieve an immediate increase in the concentration of oxygen available to the fish for respiration, and the maintenance of the desired oxygen concentration over an extended period of time. In the preferred embodiment of the invention the oxidizing agent employed comprises potassium permanganate.

11 Claims, No Drawings

METHOD OF INDUCING FEEDING BEHAVIOR IN FISH

FIELD OF THE INVENTION

The present invention relates generally to methods for affecting the feeding behavior of fish, and, more specifically, relates to methods for inducing an increased level of feeding activity of fish confined within an impoundment and maintaining the increased level of feeding activity over an extended time period through chemical treatment of the aquatic environment.

BACKGROUND OF THE INVENTION

In recent years there has been a substantial increase in the production of fresh water food fish through fish farm culture of, especially, catfish, in relatively small artificially created and maintained ponds or other impoundments. One approach to the harvesting and sale of fish produced by such fish farms is the establishment of a commercial enterprise often referred to as a "pay lake", in which members of the public are allowed to take fish from the impoundments by baited hook and line. It is common for the operators of such pay lakes to charge a nominal admission fee to fish the impoundments, and to charge for fish actually harvested on a weight basis. It is therefore critical to the financial success of these enterprises that fishermen be able to achieve success in actually catching fish, since the admission fees themselves seldom generate sufficient income to maintain a profitable business operation. It is also preferred that the feeding activity of the fish in such impoundments be such that fish are not caught by fishermen at an excessively high rate, in order that a reasonable balance between recreational activity and fish harvest may be achieved. With the growth in the fish farming enterprises there has been a corresponding search for an effective method of inducing and increasing the feeding activity of fish maintained in such environments in a controlled manner.

One approach to achieving the goal of increased feeding activity is the use of luring essences applied to or incorporated into the baits used by the fishermen. Such essences, which are well known in the prior art, are typically concentrates of dead fish or other animal matter attractive to the target fish species. While such essences have been moderately successful in attracting fish which are searching for food, they do not appear to be effective in inducing or initiating feeding behavior, and the results achieved from the use of such essences in a "pay lake" setting have been highly variable.

Another approach to inducing feeding activity in fish is exemplified by U.S. Pat. No. 3,903,260, which teaches the use of amino acids, amino acid salts, and closely related compounds to stimulate feeding behavior. In the practice of the method taught by the noted patent, the compounds are introduced into the aquatic environment of the fish for the purpose of inducing an immediate feeding response. This approach is, however, primarily directed to the creation of a short term response in the fish in order to encourage complete consumption of feed simultaneously introduced into the aquatic environment, and the behavioral effects are of short duration from a single treatment. Thus, while successful for its purpose, this approach is of limited usefulness in the "pay lake" context, in which a steady feeding response over a long duration is desired. It is, therefore, an object of the present invention to provide a method of inducing feeding behavior in fish and maintaining that behavior over an extended period of up to twelve hours without the need for repetition of the steps of the method during such time period.

SUMMARY OF THE INVENTION

The present invention generally comprises a method of inducing and maintaining feeding behavior in fish, especially catfish, confined within an impoundment, by introducing an oxygenating agent into the aquatic environment of the fish and dispersing such agent through such aquatic environment, thus increasing the concentration of dissolved oxygen in the water to a desired level, and maintaining that concentration within predetermined parameters for the period in which increased feeding activity is desired. In the preferred embodiment of the method of the invention, the oxygenating agent comprises potassium permanganate and the concentration of dissolved oxygen is in the range of 6 to 9 parts per million by weight (ppm) when the temperature of the water of the impoundment is about 80 to 85 degrees Fahrenheit. The application rate of such potassium permanganate in the preferred embodiment of the invention is within the range of five to eight pounds of potassium permanganate per acre foot of water, and the resulting concentration of dissolved oxygen is within the range of about 1.5 ppm below to about 3 ppm above the saturation concentration of the water so treated.

The complete method of the invention and its embodiments will now be described in detail hereinbelow.

DETAILED DESCRIPTION OF THE INVENTION

The importance of an adequate supply of dissolved oxygen to the health and survival of fish populations in an aquatic environment is well known in relation to both natural aquatic systems and artificially maintained aquatic systems such as fish farm impoundments. It is also known that different fish species require different levels of oxygen concentration for survival. However, the effect of dissolved oxygen concentration on fish behavior has not been well understood beyond simple identification of behaviors evidencing stress resulting from low oxygen levels. It is further known that the solubility of oxygen in water decreases with increasing water temperature, and it is a common practice in fish farming operations to provide mechanical means, such a mechanical agitation devices, of increasing the oxygen concentration in the fish containment impoundments, especially during the summer months, for the purpose of preventing depressed oxygen levels and resulting fish mortality. It has now been found that an elevation in oxygen concentration above the level considered necessary and appropriate for prevention of excessive stress and mortality will produce a qualitative and quantitative change in fish behavior, and that such behavior can be controlled by controlling the oxygen concentration.

Studies of catfish confined in an artificial pond or impoundment typical of catfish farming operations in the southern United States have indicated that the catfish will survive well with only limited stress or mortality problems in conditions characterized by oxygen concentrations in the range of 3 to 5 ppm. Because of the normally high summer temperatures and the typically high fish population density in a fish farm environment, mechanical agitation of the impoundment water is necessary in order to maintain oxygen concentrations in the 3 to 5 ppm range, with water temperatures in the 80 to 85 degree Fahrenheit range, but use of mechanical agitation to raise oxygen concentrations above that level is generally impractical. It has been found in a "pay lake" context, characterized by fish harvesting by means of baited hook and line, that catfish feeding activity, and thus harvesting success, from such a typical environment is sporadic and unpredictable. However, it has also been found that with an increase of oxygen concentration to a level of 6 to 9 ppm in 80 to 85 degree Fahrenheit water, the feeding behavior of the catfish is proportionately increased and will be maintained at the accelerated level until the oxygen content is allowed to decrease. Freshwater catfish exhibit a decrease in activity with decreasing water temperature, and the effect of oxygen concentration on feeding behavior is less pronounced when water temperature falls below about 60 degrees Fahrenheit.

Studies have demonstrated that addition of potassium permanganate, an active oxidizing agent, to the aquatic environment will result in liberation of free oxygen upon reduction of the potassium permanganate compound, with a corresponding increase in the dissolved oxygen concentration in the treated water. Potassium permanganate is often used in various aquatic environments as a water clarifying agent, and its effects on fish populations, at least in the relatively low concentrations utilized in the practice of the present invention, are known to be benign.

It has been found and demonstrated by the inventor that addition of potassium permanganate to the water of fish containment impoundments in sufficient quantities to raise the oxygen concentration of such water to a level falling within the range of 6 to 9 ppm, with water temperature in the range of 80 to 85 degrees Fahrenheit, will induce fish confined within such impoundment to begin or accelerate active feeding behavior characterized by active seeking out and taking of baited hooks, resulting in a dramatic increase in the rate of fish harvest from the impoundment by baited hook and line. With such water conditions, the inducement of such active feeding behavior in catfish begins at an oxygen concentration of about 6 ppm, and the level of feeding activity shows a steady increase with increase in oxygen concentration from 6ppm to above 10 ppm. In the experience of the inventor, feeding behavior of catfish in 80 to 85 degree Fahrenheit water is optimized when oxygen concentrations are maintained within the 6 to 9 ppm range, despite the continued manifestation of accelerated feeding behavior at higher concentrations The inventor's studies and experiments have been conducted with channel catfish confined within an artificial earthen impoundment typical for catfish farming operations, having a surface area of slightly less than 0.20 acre and an average depth of approximately five feet, thus containing a volume of water of approximately 0.75 acre-foot. The catfish population maintained in the impoundment during the test period comprised approximately two thousand to six thousand pounds of catfish, a population density within the typical range for catfish farming operations. The studies and experiments were conducted primarily during the summer months, the most active and productive period for a "pay lake" operation. The test impoundment was provided with a single central aeration agitator which was operated continuously. The base level oxygen concentration in the impoundment, with agitation of the water but prior to addition of any oxygenating agent, was approximately 4.5 to 5 ppm, with water temperature of 80 to 85 degrees Fahrenheit.

Experiments performed by the inventor have indicated that the dissolved oxygen concentration effective in inducing and maintaining accelerated feeding behavior in fish at various water temperatures is closely related to the saturation concentration of oxygen in water at those temperatures. The saturation concentration of oxygen in water at a temperature of 85 degrees Fahrenheit is about 7.5 ppm, while the saturation concentration of oxygen in water at a temperature of 40 degrees Fahrenheit is in excess of 12 ppm. Studies of the effectiveness of the method of the invention have been performed with water temperatures ranging from below 60 degrees Fahrenheit to over 85 degrees Fahrenheit, and it has been found that application of the same weight of potassium permanganate per acre foot of water at varying temperatures within the effective range of the method of the invention has resulted in inducement of accelerated feeding behavior of the fish contained within such water. It is believed that, at least in water temperatures above about 60 degrees Fahrenheit, the free oxygen liberated upon solution and decomposition of the potassium permanganate is of sufficient quantity to elevate the dissolved oxygen concentration of the water to which it is applied to a point near saturation or of slight super-saturation. It may be concluded from this mechanism and experimental results that inducement of accelerated feeding behavior results from elevation of the dissolved oxygen concentration of the treated water to a range of about 1.5 ppm below to about 3 ppm above the saturation concentration of oxygen in such water.

In practicing the preferred embodiment of the method of the invention, dry potassium permanganate crystals are broadcast on the surface of the water in the impoundment in the vicinity of the agitator at an application rate of five to eight pounds of potassium permanganate crystals (minimum 97% pure) per acre-foot of water. For the specific test impoundment utilized by the inventor the typical application rate was six pounds of potassium permanganate per acre-foot of water. The oxygenating agent is allowed to disperse throughout the impoundment, as initial decomposition of the compound occurs, for a period of approximately one to two hours, during which time accelerated feeding activity by the fish in the impoundment has begun to occur. Decomposition of the potassium permanganate, with resulting liberation of free oxygen, occurs gradually following treatment, and it has been found that only one treatment per day is required to maintain the accelerated feeding activity at a desired level. Potassium permanganate treatment may be repeated each day for not more than three consecutive days, and should then be discontinued for at least one intervening day. Studies have shown that the increased feeding activity is not manifested on such intervening days, but that the discontinuation of treatment for at least one intervening day is necessary to avoid excessive stress on the catfish population of the impoundment. During the days in which potassium permanganate is applied to the water of the impoundment the fish contained in the impoundment are not fed for a period of twelve hours following treatment. During any period in which the method of the invention using potassium permanganate as the oxygenating agent is utilized, only a floating feed should be used, and only in a quantity which will be consumed by the fish within approximately fifteen minutes. It has been found that the presence of uneaten food in the impoundment water results in chemical consumption of dissolved oxygen in the water through oxidation of the organic components, thus reducing the free oxygen concentration and limiting the effectiveness of the treatment in inducing feeding behavior. In order to prevent accumulation of the products of decomposition of potassium permanganate, principally manganese dioxide, in the impoundment with continued treatment, the total volume of impoundment water is exchanged weekly by pumping or draining water from the bottom of the impoundment and introducing fresh water at the surface of the impoundment.

Potassium permanganate, when applied at the rates specified, will impart a reddish purple color to the water as it disperses, and such color change is useful as a visual indication of the dispersal and solution of the potassium permanganate in the water. As the potassium permanganate decomposes there is a chemical shift from the presence of that chemical to its principal decomposition product manganese dioxide, which is accompanied by a color shift from reddish purple to a rusty brown color. This color shift is also useful as a visual indication of the progress and stage of treatment. If desired for asthetic reasons, non-toxic water dyes may be added to the water of the impoundment to mask the color changes. In addition, other treatment agents of benefit to the aquatic environment, including sodium chloride, agricultural lime, fertilizer, and herbicides, may be applied to the water in conjunction with potassium permanganate or other oxygenating agents utilized in practicing the method of the invention without interference with the desired effect on fish behavior.

Potassium permanganate has proved to be a highly effective treatment agent when used in accordance with the method of the invention, and has the advantage of relatively show decomposition with a corresponding release of free oxygen over an extended period of up to twelve hours. However, the method of the invention is readily adaptable to use with other oxygenating agents with the necessary characterics of low fish toxicity and acceptability for human consumption at the concentrations resulting from treatment in accordance with the disclosed method. For example, it has been found that gaseous oxygen, when bubbled through 80 to 85 degree Fahrenheit water contained in a fish impoundment, in sufficient volume to raise the dissolved oxygen concentrations to the 6 to 9 ppm level, will have the same effect of inducing active feeding behavior in catfish. The major disadvantage of the use of gaseous oxygen in a commercial fish farming operation relates to its cost effectiveness rather than to its effectiveness in producing the desired result of accelerating feeding activity.

It will be understood that the rate of oxygen consumption in an aquatic environment is affected by the rate of natural chemical reactions such as oxidation of organic materials present in the environment, and the amount of potassium permanganate or other oxygenating agent necessary to accomplish the desired elevation in free oxygen concentration may vary until a steady state in the impoundment is achieved through continued practice of the method of the invention. It will also be readily understood and expected that the method of inducing feeding behavior in fish through elevation of the concentration of dissolved oxygen in the aquatic environment of the fish is adaptable for effective use with fish species other than catfish.

The foregoing detailed description of the preferred embodiment of the method of the invention is illustrative and not for purposes of limitation, and it will be understood that the method of the invention is susceptible to many variations and modifications without departing from the scope and spirit thereof.

What is claimed is:

1. A method of inducing accelerated feeding behavior in fish contained within a natural or artificial impoundment of water for the purpose of enticing such fish to seek out and strike a baited hook, comprising the steps of:

selecting for introduction into the water of the impoundment a water soluble chemical oxidizing agent characterized by liberation of free oxygen upon solution in the water of the impoundment, and having a low level of toxicity to the fish confined within said impoundment;

initially introducing into and dispersing through the water of the impoundment a sufficient quantity of said oxidizing agent to elevate the dissolved oxygen concentration of the water of the impoundment by not less than 1 part per million by weight above the concentration immediately prior to the introduction of said oxidizing agent, to a level within the range of not more than 1.5 parts per million by weight below to 3 parts per million by weight above the saturation concentration of dissolved oxygen in the water of said impoundment, such that accelerated feeding behavior of the fish contained within said impoundment is induced;

continuing introduction into and dispersion through the water of the impoundment a sufficient quantity of said oxidizing agent at such time intervals as necessary to maintain the dissolved oxygen concentration of the water of the impoundment within said range of not more than 1.5 parts per million by weight below to 3 parts per million by weight above the saturation concentration for such period of time as accelerated feeding behavior is desired; and discontinuing introduction of said oxidizing agent to the water of said impoundment for at least one day following not more than three consecutive days of treatment of said water with said oxidizing agent.

2. The method of claim 1, wherein said fish comprise catfish.

3. The method of claim 1, wherein said oxidizing agent is selected from the group consisting of alkali metal permanganates.

4. The method of claim 1, wherein said fish comprise catfish, said oxidizing agent comprises a mixture containing not less than seventy-five percent potassium permanganate by weight, and the quantity of oxidizing agent initially introduced into the water of said impoundment is within the range of 1 to 10 pounds per acre foot of water contained within said impoundment.

5. The method of claim 4, further comprising the steps of:

withholding feed from the fish contained within said impoundment for a period of not less than twelve hours following introduction of said oxidizing agent into the water of said impoundment; and exchanging the total volume of water contained within said impoundment, by pumping or draining water from the bottom of said impoundment and introducing fresh water to the top of said impoundment, when the aggregate weight of potassium permanganate introduced into said water since the last exchange of said water exceeds about fifty pounds, to prevent excessive build-up of decomposition products of said potassium permanganate.

6. A method of inducing accelerated feeding behavior in catfish contained within a natural or artificial impoundment of water for the purpose of enticing said catfish to seek out and strike a baited hook suspended within the water of the impoundment, and maintaining such accelerated feeding behavior over an extended period of time, comprising the steps of:

introducing into and dispersing through the water of the impoundment a chemical oxidizing agent consisting essentially of potassium permanganate at an oxidizing agent application rate within the range of 1 to 10 pounds of potassium permanganate per acre foot of water contained within said impoundment per day;

allowing said oxidizing agent to further disperse and dissolve in said water for a time period of one-half to two hours immediately following initial introduction of said oxidizing agent into said water for initiation of accelerated feeding behavior of said fish to manifest;

withholding feed from said fish contained within said impoundment for a period of not less than twelve hours following any introduction of said oxidizing agent to said water;

utilizing only a floating type of fish feed for feeding said fish contained within said impoundment after the expiration of said twelve hours, and restricting application of feed to an amount which will be consumed by said fish before said feed becomes saturated with water and sinks from the surface of said water;

continuing introduction of said oxidizing agent to said water of said impoundment for not more than three consecutive days, and allowing at least one full day without introduction of any amount of said oxidizing agent to said water before resuming introduction of said oxidizing agent;

exchanging the total volume of said water contained in said impoundment, by pumping or draining said water from the bottom of said impoundment and introducing fresh water to the surface of the water contained in said impoundment, at a rate of approximately one exchange per week of continued introduction of said oxidizing agent to said water in accordance with the foregoing steps, or after introduction of an amount of said oxidizing agent aggregating not more than about fifty pounds since the last exchange of said water; and adjusting the rate of application of said oxidizing agent to said water within said range of 1 to 10 pounds of potassium permanganate per acre foot of said water per day as necessary to maintain the feeding behavior of the catfish contained within said impoundment at the desired level.

7. The method of claim 6, further including the step of continuously agitating the water of said impoundment by mechanical agitation means throughout the period of use of said oxidizing agent.

8. The method of claim 6, wherein the initial application of said oxidizing agent to said water of said impoundment is at the rate of 5 to 8 pounds of potassium permanganate per acre foot of said water per day, the dissolved oxygen concentration of said water is monitored at least daily, and the rate of application of said oxidizing agent is adjusted to maintain said dissolved oxygen concentration of said water within the range of about 6 to 9 parts per million by weight, as measured at a depth of not more than three feet below the surface of said water.

9. The method of claim 6, wherein the dissolved oxygen concentration of said water of said impoundment is measured prior to the introduction of any of said oxidizing agent to said water, the initial application of said oxidizing agent to said water of said impoundment is at the rate of 5 to 8 pounds of potassium permanganate per acre foot of said water per day, the dissolved oxygen concentration of said water is monitored at least daily, and the rate of application of said oxidizing agent is adjusted to maintain said dissolved oxygen concentration of said water within the range of 1.5 to 5 parts per million by weight above the dissolved oxygen concentration of said water prior to the initial application of said oxidizing agent to said water.

10. The method of claim 6, wherein the dissolved oxygen concentration of said water is monitored at least daily, and the rate of application of said oxidizing agent is adjusted to maintain said dissolved oxygen concentration of said water within the range of not more than 1.5 parts per million by weight below to 3 parts per million above the saturation dissolved oxygen concentration of said water.

11. The method of claim 6, wherein said oxidizing agent is introduced into said water of said impoundment as part of a mixture containing additional water treatment agents comprising sodium chloride and non-toxic water soluble dyes.

* * * * *